March 19, 1968  D. H. THORBURN  3,373,935

MULTIPLEX PNEUMATIC CONTROL UNIT

Filed Oct. 15, 1965  3 Sheets-Sheet 1

Inventor:
David H Thorburn,
By Hume, Groen, Clement + Hume
attys.

March 19, 1968  D. H. THORBURN  3,373,935

MULTIPLEX PNEUMATIC CONTROL UNIT

Filed Oct. 15, 1965  3 Sheets-Sheet 2

Inventor:
David H. Thorburn,
By Hume, Groen, Clement + Hume
Attys

March 19, 1968 D. H. THORBURN 3,373,935
MULTIPLEX PNEUMATIC CONTROL UNIT
Filed Oct. 15, 1965 3 Sheets-Sheet 3

Inventor:
David H. Thorburn,
By Hume, Groen, Clement + Hume
Attys

United States Patent Office 3,373,935
Patented Mar. 19, 1968

3,373,935
MULTIPLEX PNEUMATIC CONTROL UNIT
David H. Thorburn, Oak Park, Ill., assignor to The Powers Regulator Company, Skokie, Ill., a corporation of Illinois
Filed Oct. 15, 1965, Ser. No. 496,629
10 Claims. (Cl. 236—82)

ABSTRACT OF THE DISCLOSURE

A multiplex digital pneumatic control system, employing a single signal generating device in conjunction with a plurality of analog pressure signal sources and a plurality of pressure pulse operated regulatory devices. The signal generating device is adapted to convert analog pressure signals to digital or pulsed pressure signals, and may employ negative feedback control. Switch means provide selective simultaneous connection of one each of the plurality of analog signal sources and the plurality of pulse operated regulatory devices with the signal generating devices.

---

This invention pertains to a multiplex pneumatic control unit and, in particular, to a system which permits multiplex utilization of a single basic digital pneumatic control device.

United States Patent No. 3,319,644 discloses a device for generating digital pneumatic control signals in response to an analog pressure signal from a sensor, to operate a regulatory mechanism. For example, in an air conditioning system where the temperature is controlled by hot or cold water and the water flow rate is regulated in accordance with the temperature, the device may be used to control the operation of a valve in the water line. The device would generate an analog pressure signal proportional to the sensed temperature, convert the analog signal to a pulsed pressure signal, and utilize this latter signal to operate the valve.

Such digital pneumatic control devices, however, are relatively complex, and may therefore be fairly expensive. If, for example, it is desired to air condition a building having a number of rooms and provide individual temperature regulation for each room, it would ordinarily be necessary to provide a separate control unit for each room. This, of course, might well become a costly proposition depending upon the number of rooms. Thus, the present invention is directed to a system wherein a single digital pneumatic control device may be utilized with a plurality of temperature sensing and regulating mechanisms.

Accordingly, one of the foremost objects of the present invention is a digital pneumatic control device which is adapted for multiplex utilization.

Another object of the invention is the provision of a control device adapted to convert analog signals from a plurality of sources into a plurality of digital pneumatic signals.

Yet another object of the invention resides in the provision of a control device adapted to convert analog signals into pneumatic digital signals which may be utilized for operating a plurality of regulatory mechanisms.

A still further object of this invention is the provision of an air conditioning control system which is selectively responsive to a plurality of analog pressure input signals for generating one or more serial pneumatic pulses. Such pulses may be utilized selectively to operate a plurality of pulse operated regulatory instrumentalities of the type adapted to regulate the heating or cooling medium of an air conditioning installation.

A specific object of the invention is the provision of a pneumatic control system including a digital pneumatic control device and a number of selector switches for connecting and disconnecting input, output and feedback subsystems to and from the control device.

A fuller appreciation for these and other objects and a complete understanding of the structure and operation of the invention may be had by referring to the following description and claims, taken in conjunction with the following drawings, in which:

Figure 1:
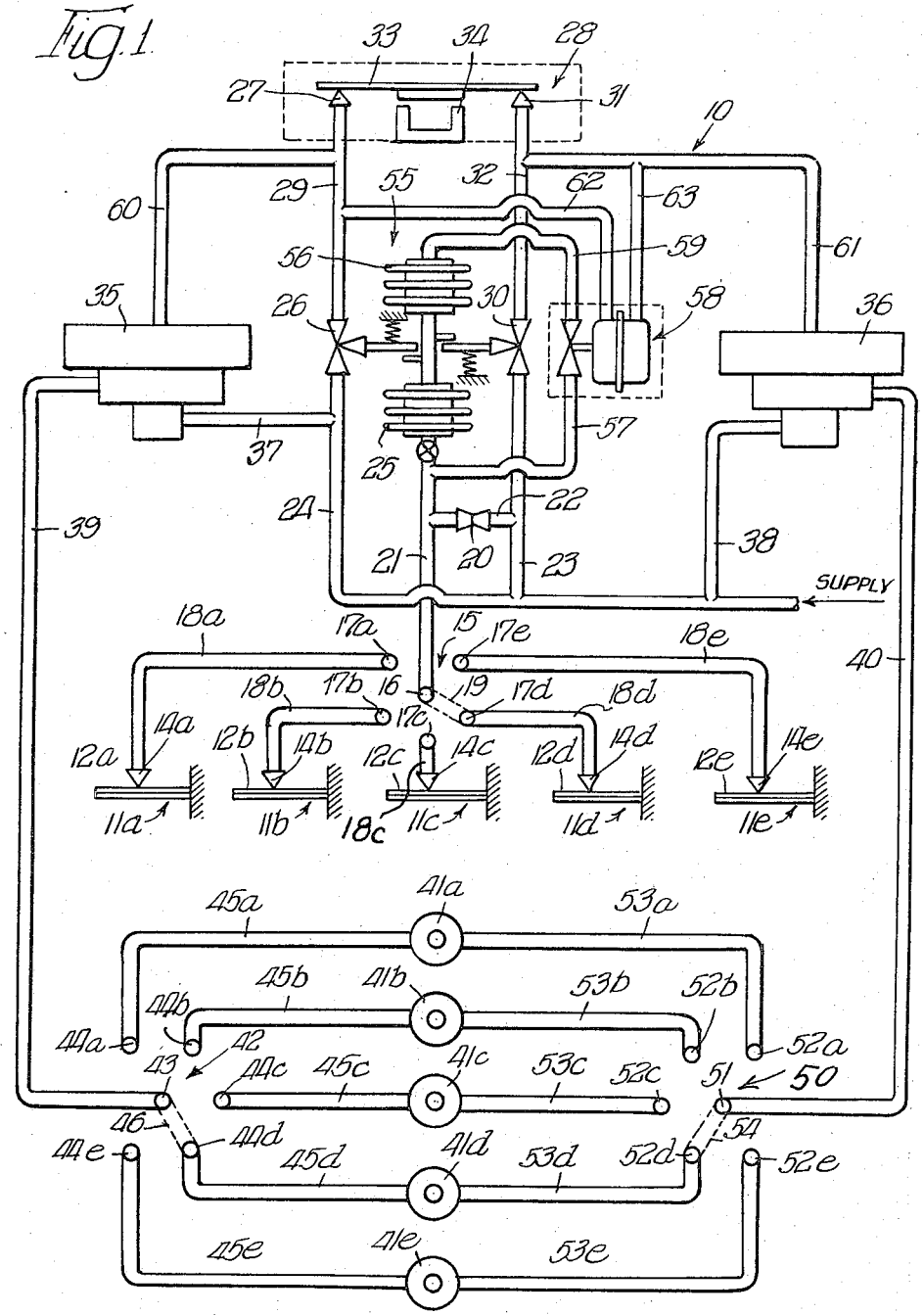
FIGURE 1 is a schematic illustration of a system embodying the invention.

With reference to FIGURE 1, there is shown a schematic illustration of a system which embodies the claimed invention. For purposes of convenience, the invention at various times will be described as used in conjunction with specific types of control systems such as those used in heating and cooling applications. Also, various components of the systems, such as valves, pneumatic pulse amplifiers, pulse operated actuators, and the like, will not be described in detail; reference will be made to United States Patent No. 3,319,644 for a detailed disclosure of such components. Accordingly, it will be understood that such specific references are by way of example and are not to be construed as limitations. The subject invention may be utilized wherever it will perform in the manner intended and provide the desired results.

As shown in FIGURE 1, the system includes a signal generating unit generally denoted by the numeral 10 as will be described hereinafter. The signal generating unit is connected to a plurality of suitable analog type signal transmitters, such as the flapper nozzle arrangements 11a, 11b, 11c, 11d and 11e, by means of a rotary selector switch 15. The rotary selector switch 15 has a common port 16 which is adapted for selective connection with outlet ports 17a, 17b, 17c, 17d and 17e by means of a rotatable conduit 19. As shown in FIGURE 1, the rotatable conduit 19 is in position to connect the common port 16 with the outlet port 17d.

The outlet ports 17 are connected to the flapper nozzle arrangements 11a through 11e by means of conduits 18a, 18b, 18c, 18d and 18e. Since the flapper nozzle arrangements are identical in operation and construction, it will be sufficient to describe only one of them, 11d, in detail.

The flapper nozzle arrangement 11d consists of a nozzle 14d which is connected to a conventional source of supply pressure via conduits 18d, 19, 21, 22, 23, and 24. A restriction 20 is mounted in the conduit 22. The nozzle 14d is adapted to exhaust to atmosphere with the exhaust being controlled by the flapper 12d. The flapper 12d may be a bi-metallic unit adapted to deflect in accordance with sensed temperature. As the flapper 12d moves toward the nozzle 14d, the exhaust therefrom is restricted so that the pressure in the conduit 21 on the downstream side of the restriction 20 is increased. As the flapper 12d moves away from the nozzle 14d, the exhaust is less restricted so that the pressure on the downstream side of the restriction 20 is decreased. In this manner, an analog pressure signal commensurate with sensed temperature is generated.

The signal generating unit 10 is connected to the flapper nozzle arrangement 11d by the input signal conduit 21 so that the analog signal is communicated thereto. In the signal generating unit 10, the analog signals are communicated to a pressure sensing device such as the bellows 25. The bellows 25 is adapted to extend and contract in accordance with the pressure received therein. As shown schematically in FIGURE 1, the bellows 25 is mechanically connected with a restrictor valve 26 for moving the same between open and closed positions. Exemplary mechanical constructions for the bellows and restrictor valve assembly and other components of the system are disclosed in United States Patent No. 3,319,644.

The restrictor valve 26 is connected to a source of supply pressure by the conduit 24 and to a nozzle 27 in the pulse former 28 by a conduit 29. The restrictor valve 26 is adapted to move between variably open and closed positions. When the system is at equilibrium the restrictor valve 26 will be closed.

A similar restrictor valve 30 is connected to the supply conduit 24 by a conduit 23 and to a nozzle 31 in the pulse former 28 by a conduit 32.

The nozzles 27 and 31 are adapted when in an open position to exhaust to atmosphere. Then ozzles, however, are normally closed by means of a flapper or flappers 33 biased into engagement therewith. The biasing means may take any suitable form such as a magnet 34 as indicated in FIGURE 1 or a spring or the like.

The conduits 29 and 32 are connected to a pair of pulse amplifying valves 35 and 36 via conduits 60 and 61, respectively. The pulse amplifying valves 35 and 36 are in turn connected to the supply conduit 24 by conduits 37 and 38, respectively, and are of the type adapted to receive and amplify a pressure signal a predetermined amount. Such amplifying valves may consist of a series of diaphragms in which the input signal acts upon a large diaphragm and the output signal is produced by the responsive action of a smaller diaphragm whereby the amplification is a function of the ratio of the areas of the diaphragm. One form of amplifying valve useable in this system is described in United States Patent No. 3,319,644. The pulse amplifying valves 35 and 36 are connected respectively by the conduits 39 and 40 for communicating the amplified signals to a plurality of suitable actuators 41a, 41b, 41c, 41d and 41, which will be described hereinafter.

The signal generator 10 further includes a negative feedback circuit generally denoted by the numeral 55. The feedback circuit 55 includes a feedback bellows 56, which is mounted in opposing relationship to the input signal bellows 25, and a conduit 57 which is connected at one end to the analog signal input conduit 21 and at its other end to a pulse operated valve 58. The valve 58 is normally closed but is adapted to be operated by pressure pulses between open and closed positions. The valve 58 is connected by the conduit 59 to the bellows 56. An exemplary pulse operated valve suitable for use in this system is described in United States Patent No. 3,319,644.

The valve 58 is adapted to be controlled by pneumatic pressure pulses received from the conduits 29 and 32 via the branch conduits 62 and 63, respectively. Thus, when the analog input signal into the conduit 21 is represented by an increase in pressure, pneumatic fluid will be allowed to flow from the conduit 57 through the valve 58 to the conduit 59 and the bellows 56. If, on the other hand, the input signal is a decrease in pressure in the conduit 21, the flow of pneumatic fluid through the valve 58 will be in the opposite direction. A more detailed disclosure of the role played by the valve 58 and the bellows 56 in effecting feedback control of the system may be had by reference to United States Patent No. 3,319,644.

The pneumatic pulse amplifiers 35 and 36 are connected by the conduits 39 and 40 to the common ports 43 and 51 of rotary selector switches 42 and 50, respectively. The selector switches 42 and 50 serve to selectively connect the pulse amplifiers 35 and 36 respectively to the pulse operated actuators 41a through 41e. Since the rotary selector switches 42 and 50, as well as the rotary selector switch 15, are substantially identical in operation and construction, it will be necessary to describe only one of them in detail.

Figure 3:
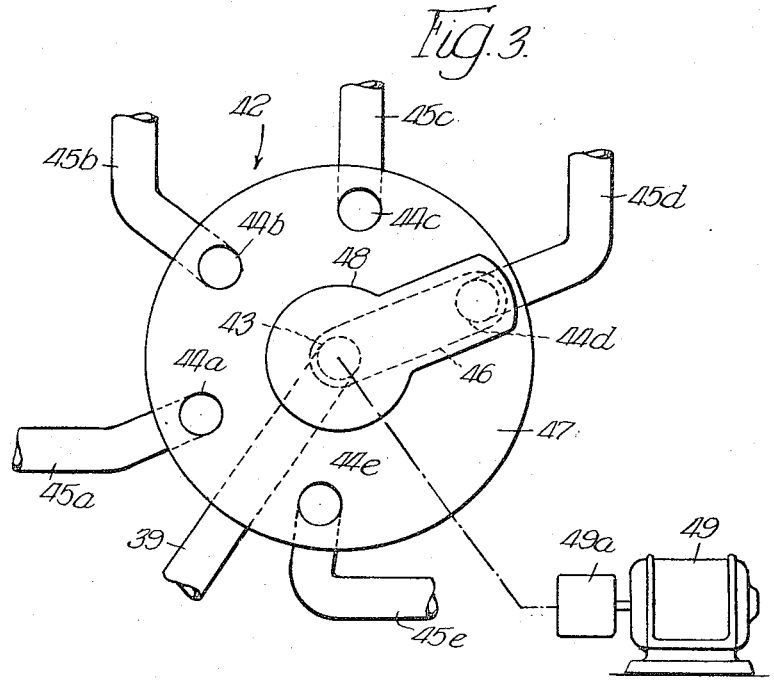
FIGURE 3 is a top view of a rotary selector switch suitable for use in the systems shown in FIGURES 1 and 2.

Referring now to FIGURE 3, there is shown an exemplary rotary selector switch 42 which may be used in the system described herein. The switch 42 includes a plate 47 provided with a plurality of outlet ports 44a, 44b, 44c, 44d, and 44e. While the switch as shown has only five outlet ports, this number has been chosen arbitrarily for purposes of illustration, and it is understood that the switch may have virtually any number of stations, dependent only upon the practical limits of the system.

Suitably mounted for rotation on the plate 47 is a housing 48 which defines a rotatable conduit 46. The conduit 46 is adapted to connect the common port 43, which is positioned at or near the axis of rotation of the housing 48, with a selected one of the outlet ports 44a through 44e. Thus, as the housing 48 is rotated, the common port 43 becomes successively connected with each of the outlet ports 44a, 44b, 44c, 44d and 44e. As shown in FIGURE 3, the housing 48 is in position for the connection of the common port 43 with the outlet port 44d. Assuming clockwise rotation of the housing 48, the common port 43 will be connected next to the outlet port 44e, and then to the outlet ports 44a, 44b, 44c and so on in succession.

Shown schematically in FIGURE 3 is a motor 49 which preferably may be utilized to effect automatic rotation of the housing 48 and selection of switch stations. The motor 49 may be of any suitable type and may be electrically, mechanically or otherwise powered. Disposed in the drive train between the motor 49 and the housing 48 is a gear box 49a which comprises a gearing arrangement of a type suitable for changing continuous rotary motion to intermittent rotary motion. One particularly suitable type of gearing arrangement is the well-known "Geneva wheel." The use of a suitable intermittent gearing arrangement serves to maintain the housing 48 in position over each of the outlet ports 44 for a predetermined time interval before moving the housing to the next outlet port, so as to provide sufficient time for the system to respond.

The outlet ports 44a, 44b, 44c, 44d and 44e of the rotary selector switch 2 are connected respectively to the conduits 45a, 45b, 45c, 45d and 45e, which communicate with various portions of the system, and the common port 43 is likewise connected to the conduit 39. As shown in FIGURE 1, the conduit 39 connects with the pulse amplifier 35, and the conduits 45a through 45e connect with the actuators 41a through 41e. In like manner, the rotary selector switch 50 serves to connect the pulse amplifier 36 selectively to one of the actuators 40a through 41e via the conduit 40, the common port 51, the rotatable conduit 54, the outlet ports 52a through 52e and the conduits 53a through 53e. As shown in FIGURE 1, the switches 42 and 50 are in position to connect the pulse amplifiers 35 and 36 respectively to the actuator 41d.

The operation of the system shown in FIGURE 1 can now be described. Assume, for example, that the system is intended to control the individual temperature in five different rooms in a single building. Let the five rooms be designated A, B, C, D and E. Thus, each of the temperature sensing flapper nozzle arrangements 11a through 11e would be located in a different room: 11a in room A, 11b in room B, etc. Likewise, each of the actuators 41a through 41e would be adapted to actuate a valve or other control mechanism located in, for example, a hot-water line in one of the rooms. Thus, the actuator 41a would be adapted to actuate a valve in a hot-water line in room A, the actuator 41b would be likewise adapted to actuate a valve in a hot-water line in room B, etc.

The rotary selector switches 15, 42 and 50 will, of course, be synchronized for operation so that, when the flapper nozzle arrangement 11a is connected with the system, the actuator 41a will also be connected with the system. Likewise, when the selector switch 15 moves to its B position, thus disconnecting the flapper nozzle arrangement 11a and connecting the flapper nozzle arrangement 11b to the system, the selector switches 42 and 50 will also operate to disconnect the actuator 41a and connect the actuator 41b to the system. Preferably, complete synchronization can be provided by gang-mounting the switches 15, 42 and 50 on a single driving member which is connected to the gear box 49a. As shown in FIGURE 1, all of the switches 15, 42, and 50 are in the D position, and therefore the flapper nozzle arrangement 11d and the actuator 41d are connected for operation in the system. Accordingly, the operation of the system will be described in terms of the D position.

When the pressure in the input signal conduit 21 is increased above the normal equilibrium pressure level due, for example, to an increase in temperature sensed in room D by the flapper nozzle arrangement 11d, the bellows 25 is forced into an extended condition whereby the restrictor valve 26 is opened a commensurate amount. When this happens, pressure is communicated to the nozzle 27. The valve 26 is constructed so that even at full open operation there is an inherent drop in pressure. This drop in pressure causes a delay in the build-up of pressure within the nozzle 27 and the adjoining conduit 29. Ultimately, however, the pressure within the nozzle 27 will approach supply pressure or at least a pressure level that is sufficient to force the flapper 33 upward against the downward force exerted by the magnet 34. The pressure within the nozzle 27 is then immediately reduced at a rate depending upon the size of the nozzle opening, due to exhaustion of the nozzle to atmosphere.

The reduction in pressure permits the flapper 33 to return to its normal position at which time the pressure begins to repeat the build-up portion of the cycle. The increase in pressure and the subsequent reduction is transmitted to the pulse amplifier 35 which is actuated to cause a corresponding amplification of the increase in pressure. The increase and subsequent decrease in pressure constitute a pulse which in turn is communicated through the conduit 39 to the actuator 41d. Each pulse causes a predetermined amount of movement of the actuator 41d. For example, if the actuator 41d connects with a valve in room D which moves between its open and closed positions by rotation, then each pulse could represent, for example, a quarter of a turn. Thus, if the input signal generated by the flapper nozzle arrangement 11d in accordance with the sensed temperature in room D dictates that the valves be rotated a full turn, the system would generate approximately four pulses.

It is understood that the pulse amplifiers 35 and 36 could be omitted where the pulses generated by the system are of sufficient strength to perform the desired operations. The pulse amplifiers are principally for amplification and to permit the adaptation of the system for various forms of utilization. The pulse amplifying valves also serves to amplify the volume of air transmitted which in the pulse generating portion of the system is limited due to the use of the restrictor valves 26 and 30.

In addition to each of the pulses formed by the nozzle 27 being transmitted to the pulse amplifier 35, they are also transmitted to the pulse operated valve 58. As is more completely disclosed in United States Patent No. 3,319,644, each pulse causes the valve 58 to open a predetermined amount and permit a portion of the pressure signal to be metered to the bellows 56. The portions of the pressure passed by the valve 58 are successively accumulated by the bellows 56, which thereby successively expands to exert a force in opposition to that exerted by the bellows 25. When the pressure within the bellows 56 has become substantially equal to that within the bellows 25, the valve 26 is returned to its closed position and the system is again at equilibrium or quiescence.

Should the control pressure within the line 21 decrease, the bellows 25 would contract. This would cause opening of the restrictor valve 30. Pressure would then be communicated to the nozzle 31, and the resultant pulses would be communicated to the pulse amplifier 36 and, in turn, therefrom through the conduit 40 to the actuator 41d. The pulses communicated through the conduit 40 would drive the actuator 41d in the opposite direction from those pulses received from the conduit 39. The feedback circuit 55 operates in the same manner except that the flow of pneumatic fluid through the valve 58 is in the reverse direction, from conduit 59 to conduit 57. Hence, the information represented by the pressure decrease signal is metered to and accumulated by the bellows 56 in the sense that the bellows 56 now successively contracts to bias the restrictor valve 30 toward closure.

Thus, to summarize, if an undesirable increase in temperature occurs in room D, the flapper nozzle arrangement 11d would sense the temperature increase and cause an increase in input pressure in the conduit 21. The system would respond with a series of pulses in the conduit 39 which would be communicated through the selector switch 42 to the actuator 41d, and the actuator 41d would respond to close the valve in the hot-water line in room D a predetermined amount. If, on the other hand, an undesirable decrease in temperature should occur in room D, a series of pneumatic pressure pulses would be generated and would appear in conduit 40, whence they would be transmitted through the selector switch 50 to the actuator 41d and would cause the actuator 41d to open the valve a predetermined amount.

The use of rotary selector switches to successively connect individual temperature sensing units and actuator devices to the controlled system permits the utilization of the basic control system with a number of different rooms or areas in which it is desired to control the temperature.

Figure 2:
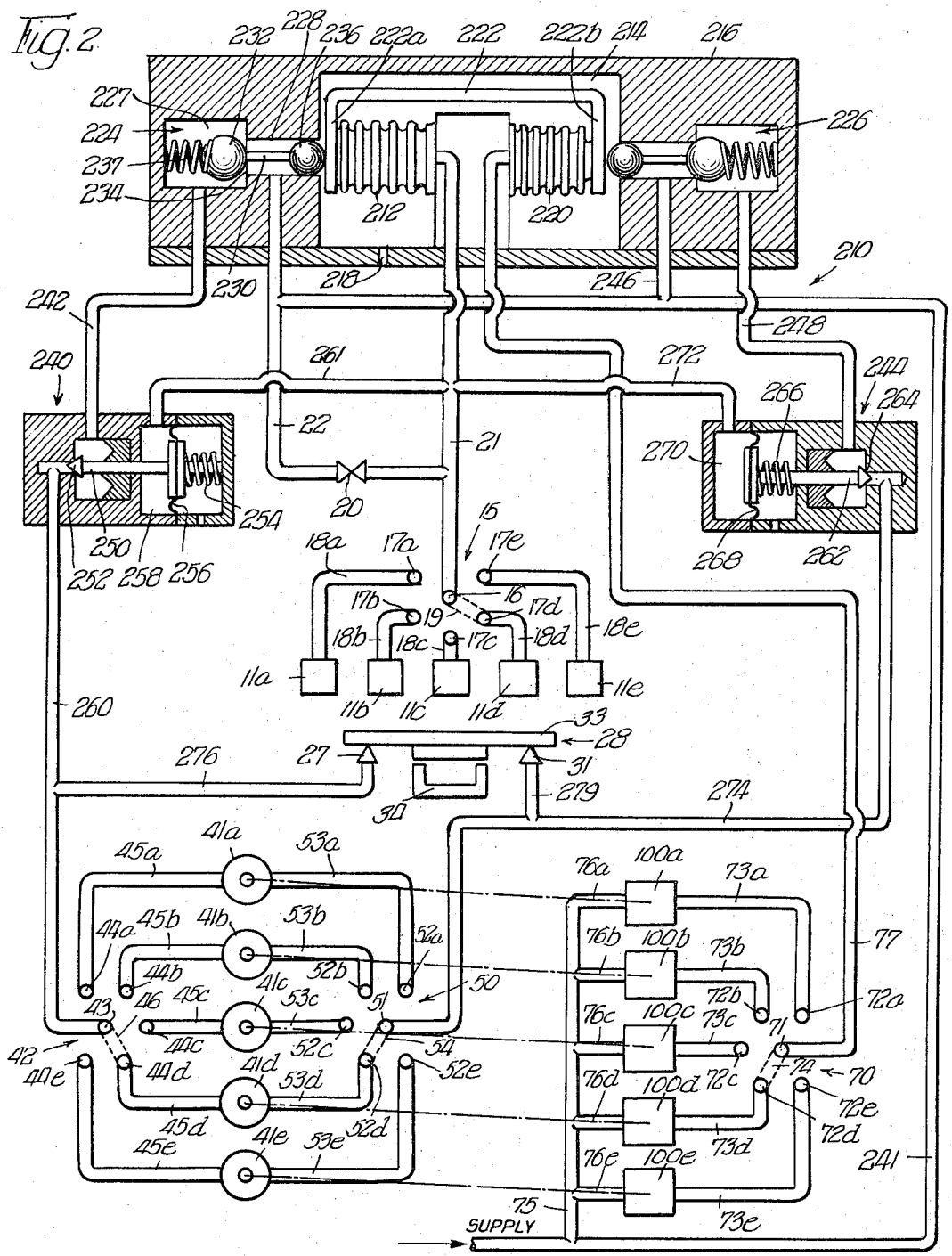
FIGURE 2 is a schematic illustration, partially in section, of another system embodying the invention.

Turning now to FIGURE 2, another system embodying the invention is shown schematically. The signal generating unit generally designated by the numeral 210 is responsive to input signals from a plurality of flapper nozzle arrangements 11a through 11e. The flapper nozzle arrangements are substantially identical to those shown in detail in FIGURE 1, and are likewise adapted for selective connection to the conduit 21 by means of the rotary selector switch 15. The construction, operation and connection of the switch 15 are substantially as described in connection with FIGURES 1 and 3. As shown in FIGURE 2, the switch 15 is in position to connect the flapper nozzle arrangement 11d to the supply line 241 via the conduit 21, the branch conduit 22 and its in-line restrictor 20.

The input pressure signals are transmitted to the signal generating unit 210 by the conduit 21 which in this system is connected to an input bellows 212 disposed in a chamber 214 defined by a casing 216. The chamber 214 is maintained at atmospheric pressure by a vent 218. Also disposed in the chamber 214 is a bellows 220 which forms part of the negative feedback circuit.

A U-shaped member 222 is disposed for reciprocal movement in the chamber 214 with its legs 222a and 222b fastened to the excursion ends of the bellows 212 and 220 respectively. Thus, the bellows 212 and 220 are interconnected in opposition such that expansion of one of the bellows 212 and 220 exerts a compression force on the other bellows and such that contraction of one of the bellows enables expansion of the other bellows.

The casing 216 further houses a pair of valves 224 and 226 which are disposed at opposite ends of the chamber 214 for operation by the member 222. The valves 224 and 226 are substantially identical in structure. Hence, only the former will be described in detail.

The casing 216 defines a chamber 227 for the valve 224. A valve member 230 which is disposed in a bore 228 extending from the chamber 214 into the chamber 227 is provided with a ball end 232 which is disposed in the chamber 227 and which is cooperative with a valve seat 234 at one end of the bore 228. The valve member 232 is further provided with a second ball end 236 which is disposed for travel in the bore 228. The length of the valve member 230 is such that, when the ball end 232 is seated in the valve seat 234, the ball end 236 protrudes slightly into the chamber 214. Hence, expansion of the bellows 212 causing impingement of the leg 222a of the member 222 against the ball end 236 unseats the ball end 232 from the valve seat 234 against the bias of a compression spring 237.

Supply pressure is communicated to the bore 228 via the branch conduit 22 connected to the supply conduit 241. The chamber 227 is connected to a restrictor valve 240 by a conduit 242. Thus, opening of the valve 224 by expansion of the bellows 212 causes the transmission of supply pressure to the restrictor 240. Communication of supply pressure from the bore 228 to the chamber 214 is precluded by the sealing effect of the ball end 236 in the bore 228.

In similar manner, opening of the valve 226 by contraction of the bellows 212 effects the transmission of supply pressure to the restrictor valve 244 via the path comprising conduit 241, conduit 246, valve 226, and conduit 248.

When the system is in equilibrium, the bellows 212 and 220 are balanced and both the valves 224 and 226 are closed.

The restrictor valves 240 and 244 are conventional pressure-operated variable restriction valves which may be of a construction similar to that illustrated in FIGURE 2. The valves 240 and 244 differ in that the valve 240 is responsive to a pressure increase in the input signal conduit 21 to open whereas the valve 244 is responsive to a pressure decrease in the input signal conduit 21 to open.

The restrictor valve 240 comprises a needle valve member 250 biased into seating engagement in a valve seat 252 by a compression spring 254. A diaphragm 256 isolates a pilot pressure chamber 258 such that a pressure increase in the input conduit 21 transmitted to the chamber 258 by a conduit 261 opens the restrictor valve 240 an amount proportional to the magnitude of the pressure increase in the conduit 21. The resultant flow through the restrictor valve 240 from the conduit 242 causes a pressure build-up in the conduit 260.

The restrictor valve 244 comprises a needle valve member 262 which is urged toward an unseated position with respect to the valve seat 264 by the compression spring 266. The valve 244 further comprises a diaphragm 268 which isolates a pilot pressure chamber 270. Normal equilibrium pressure in the conduit 21 transmitted to the chamber 270 by the conduit 272 is sufficient to overcome the force of the spring 266 and maintains the valve 244 closed. However, a pressure decrease in the input signal conduit 21 below equilibrium pressure enables the spring 266 to overcome the opposing force exerted by the pressure-loaded diaphragm 268 so as to open the valve an amount proportional to the magnitude of the pressure decrease in the conduit 21. The resultant flow through the restrictor valve 244 from the conduit 248 causes a pressure build-up in the conduit 274 at a rate proportional to the magnitude of the pressure decrease in the input signal conduit 21.

A pulse-forming, nozzle armature magnet assembly 28 is coupled to the conduits 260 and 274 by branch conduits 276 and 279, respectively. In all respects, the pulse-forming nozzle assembly 28 is the same as that described with reference to FIGURE 1 with like reference numerals indicating like parts. As shown, the nozzle 27 is connected to the conduit 276 and the nozzle 31 is connected to the conduit 279. The nozzle assembly acts in the manner previously described with reference to the FIGURE 1 embodiment to form a series of pressure pulses in the conduit 260 when that conduit is activated by the opening of the restrictor valve 240 and alternatively to form a series of pressure pulses in the conduit 274 when that conduit is activated by the opening of the restrictor valve 244.

The pressure pulses generated by the nozzle assembly 28 are communicated to a selected one of a plurality of actuators 41a through 41e by means of the rotary selector switches 42 and 50. The construction and operation of the switches 42 and 50 are as described above with reference to FIGURES 1 and 3. In like manner, the connection of the switches with the actuators 41a through 41e and the operation of the actuators is as described in connection with FIGURE 1. In FIGURE 2, the switches 42 and 50 are in position to connect the actuator 41d to the conduits 260 and 274, respectively.

The negative feedback circuit of the FIGURE 2 embodiment comprises the bellows 220, a plurality of conventional variable pressure valves 100a through 100e which are mechanically coupled to the actuators 41a through 41e, a supply pressure conduit 75 to the input conduits 76a through 76e of the valves 100a through 100e, and a feedback conduit 77 interconnecting the bellows 220 with the output conduits 73a through 73e of the valves 100a through 100e. A rotary selector switch 70, similar in all respects to the switches 15, 42 and 50, serves to connect a selected one of the valves 100a through 100e to the bellows 220 via the conduit 77. As shown, the switch 70 is in position to connect the variable pressure valve 100d to the system.

Figure 4:
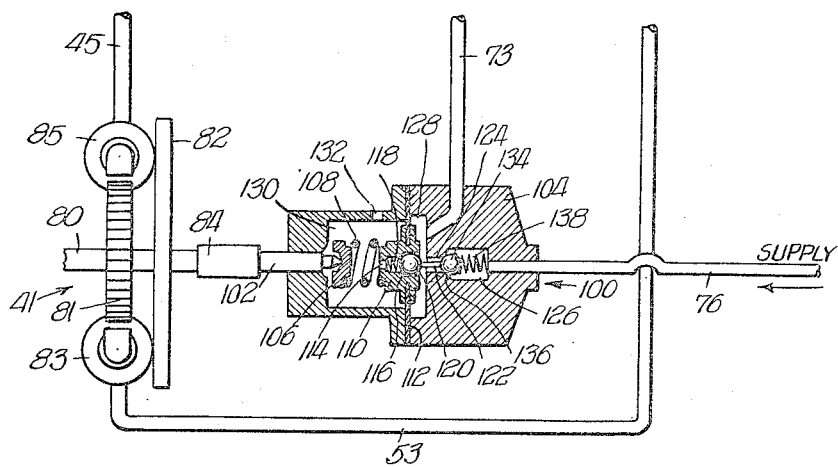
FIGURE 4 is a top view, in partial section, of a variable pressure valve in conjunction with a pulse operated actuator, suitable for use in the system shown in FIGURE 2.

Referring now to FIGURE 4, there is shown a variable pressure valve 100 in conjunction with an actuator 41, both suitable for use in the system shown in FIGURE 2. The actuator 41, as shown, is of the type described in United States Patent No. 3,319,644. The actuator 41 includes a shaft 80 mounted for rotation in a plate or frame 82 and adapted to operate a gate valve or other suitable control device (not shown). A ratchet wheel 81 is attached to the shaft 80 to provide means for rotating the shaft. A pair of pulse-operated drive assemblies 83 and 85, which are respectively connected to the conduits 53 and 45, are substantially identical except that they are mounted for selective driving of the ratchet wheel 81 in opposite rotational directions in response to pressure pulses received through the conduits 53 and 45.

The variable pressure valve 100 includes a stem 102 which is mechanically coupled to the actuator shaft 80 by member 84. The stem 102 is threaded in a casing 104 and abuts against a member 106 engaged in one end of an adjusting spring 108. The opposite end of the adjusting spring 108 bears against a member 110 centrally mounted in a flexible diaphragm 112. The member 110 is provided with a bore 114 extending centrally therethrough and including a valve seat 116. A compression spring 118 is mounted in the bore 114 so as to bias the ball end 120 of a valve member 122 away from the valve seat 116. The valve member 122 is disposed in a bore 124 in the casing 104 which bore extends between a supply pressure chamber 126 and an outlet pressure chamber 128. The diaphragm 112 separates the outlet pressure chamber 128 from an exhaust chamber 130 which is maintained at atmospheric pressure by a vent 132. A second ball end 134 for the valve member 122 is disposed in the supply pressure inlet chamber 126 and is cooperative with a valve seat 136. A compression spring 138 biases the ball end 134 toward seating engagement in the valve seat 136.

As indicated, pneumatic fluid at supply pressure is transmitted to the supply pressure chamber 126 via the conduit 76. The outlet pressure from the chamber 128 is communicated to the conduit 73 at a pressure level which is determined by the positioning of the stem 102. Thus, when the ratchet wheel 81 of the actuator 41 is rotated so as to cause inward movement of the stem 102, a force is exerted on the member 110 as a result of further compression of the spring 108 with the result that the ball end 120 is seated in the valve seat 116. Further inward movement of the stem 102 forces the ball end 134 to unseat. As pneumatic fluid accumulates in the outlet pressure chamber 128, it exerts a pressure on the diaphragm 112 in opposition to that of the adjusting spring 108. The accumulation of the pneumatic fluid in the chamber 128 continues until the pressure level is raised to a point at which the valve is again in balance and the ball end 134 again seats in the valve seat 136 closing off further input of pneumatic fluid to the chamber 128 at supply pressure. Rotation of the stem 102 so that it moves outwardly produces an opposite effect whereby pneumatic fluid is exhausted from the outlet pressure chamber 128 through the bore 114 until the pressure level in the chamber 128 decreases to a point at which the valve 100 is again in condition of balance. In this manner, the valve 100 transmits a negative feedback signal via the conduit 73, the switch 70 and the conduit 77 to the bellows 220 which is indicative of the direction and amount of rotational movement of the actuator 41.

The operation of the system of FIGURE 2 is similar to that of the system of FIGURE 1. When the pressure in the input signal conduit 21 is increased above the normal equilibrium pressure level due, for example, to an increase in temperature in room D sensed by the flapper valve arrangement 11*d*, the bellows 212 is expanded causing the valve 224 to open to transmit supply pressure to the restrictor valve 240. At the same time, the pressure increase in the conduit 21 causes the restrictor valve 240 to open an amount proportional to the magnitude of the pressure increase. The amount of opening of the restrictor valve 240 determines the rate of flow therethrough and, hence, the rate of pressure build-up in the conduit 260. When the pressure in the conduit 260 attains a level sufficient to force the flapper 33 upward, the nozzle 27 is allowed to exhaust to atmosphere and the pressure in the conduit 260 drops to a point at which the build-up cycle begins again. In this manner, a series of pulses are transmitted to the actuator 41*d* which might operate, for example, to close a valve in a hot water line in room D an amount corresponding to the number of pulses.

In response to rotation of the ratchet wheel of the actuator 41*d* produced by pulses in the conduit 260, the valve 100*d* transmits a negative feedback signal to the bellows 220 in the form of an increased pressure level indicative of the direction and amount of rotation of the ratchet wheel. The feedback pressure causes expansion of the bellows 220 and consequent forced contraction of the bellows 212 until the opposing bellows 220 and 212 are in an equilibrium condition at which time the generation of pressure pulses is discontinued.

A pressure decrease in input pressure conduit 21 below the quiescent pressure level causes a contraction of the bellows 212 and expansion of the bellows 220 which opens the valve 226 to transmit pneumatic fluid to the restrictor valve 244. Simultaneously, the pressure decrease opens the restrictor valve 244 to cause pressure build-up in the conduit 274 at a rate proportional to the magnitude of the pressure decrease in the conduit 21. In familiar fashion, the pulse-forming assembly 28 forms a series of pulses which operate the actuator 41*d* in the reverse direction. In this instance, the negative feedback signal from the valve 100*d* takes the form of a decrease in pressure communicated to the bellows 220. When the bellows 220 and 212 again reach equilibrium, the generation of pulses in the conduit 274 is discontinued. Although no pulse amplifiers are specifically provided in the embodiment of FIGURE 2, it will be apparent that pulse amplifiers such as amplifiers 35 and 36 previously mentioned with reference to FIGURE 1 may, if desired, be readily connected to the pulse conduits 260 and 274 for transmittal of amplified pressure pulses to the actuator 41*d*.

As is true with the system of FIGURE 1, the system of FIGURE 2 is adapted to permit multiplex utilization of a single basic digital pneumatic control device. Temperature sensing devices, such as the flapper nozzle arrangements 11*a* through 11*e*, may be placed in different locations, along with suitable actuating and feedback devices, such as the actuators 41*a* through 41*e* and the valves 100*a* through 100*e*, and may be selectively connected to the system through the use of the rotary selector switches 15, 42, 50 and 70, as illustrated.

In both the system of FIGURE 1 and the system of FIGURE 2, there is shown the use of five separate subsystems, each of which includes a flapper nozzle arrangement 11 and an actuator 41 and, in the case of FIGURE 2, a variable pressure valve 100 for feedback control. It should be understood, however, that this number has been chosen merely for purposes of convenient illustration. The systems described may be utilized with any desired number of subsystems, within practical limits of operation. One practical consideration is that it requires a certain finite amount of time for a system to sense and correct a temperature. If the number of subsystems were made too large, the time delay before the rotary selector switches returned to a given position might be too great for satisfactory temperature regulation as that position. However, since the basic control system is extremely rapid in performing its control functions, time delay should not be a great problem.

Thus it can be seen that the present invention provides a unique system for multiplex digital pneumatic control, wherein a single basic control device can be utilized with many temperature-sensing and valve-actuating subsystems.

Although the invention has been described with a certain degree of particularity, it should be understood that the present disclosure has been made only by way of example. Consequently, numerous changes in the details of construction and the combination and arrangement of components as well as the possible modes of utilization, will be apparent to those familiar with the art, and may be resorted to without departing from the spirit and scope of the invention as claimed.

I claim:

1. In a digital pneumatic control system including a signal generating device responsive to analog pressure signals for generating serial pressure pulses to operate a regulatory instrumentality, the combination thereof with: fluid conduit means for selectively connecting and disconnecting a plurality of sources of said analog pressure signals with said signal generating device; and fluid conduit means for selectively connecting and disconnecting a plurality of said regulatory instrumentalities with said signal generating device.

2. In a digital pneumatic control system including a signal generating device responsive to analog pressure signals for generating serial pressure pulses to operate a regulatory instrumentality, and a feedback device for providing negative feedback control of said signal generating device, the combination thereof with: fluid conduit means for selectively connecting and disconnecting a plurality of sources of said analog pressure signals with said signal generating device; fluid conduit means for selectively connecting and disconnecting a plurality of said regulatory instrumentalities with said signal generating device; and fluid conduit means for selectively connecting and disconnecting a plurality of said feedback devices with said signal generating device.

3. A multiplex digital pneumatic control system comprising:
   a plurality of analog pressure signal sources;
   a plurality of pressure pulse operated actuators;
   a signal generating device for converting an analog pressure signal into one or more serial pressure pulses;
   first switch means for selectively providing fluid communication for said analog pressure signals between each of said signal sources and said signal generating device; and
   second switch means for selectively providing fluid communication for said serial pressure pulses between each of said actuators and said signal generating device, said first and second switch means being synchronized for simultaneous operations such that one each of said signal sources and said actuators are in simultaneous fluid communication with said signal generating device.

4. A multiplex digital pneumatic control system comprising:
   a plurality of analog pressure signal sources;
   a signal generating device for converting an analog pressure signal into one or more serial pressure pulses;
   a plurality of pressure pulse operated actuators;
   a plurality of feedback devices for providing negative feedback control of said signal generating device;
   first switch means for selectively connecting each of said signal sources to said signal generating device;
   second switch means for selectively connecting each of said actuators to said signal generating device; and
   third switch means for selectively connecting each of said feedback devices to said signal generating device, said first, second and third switch means being synchronized for simultaneous operation.

5. An air conditioning system for controlling the air temperature in a plurality of areas, including:
   a plurality of sub-systems, one of said sub-systems being located in each of said areas, and each of said sub-systems comprising:
      a temperature-sensing signal source for generating an analog pressure signal proportional to the sensed temperature,
      a temperature-regulating instrumentality, and
      a pulse-operated actuator adapted to operate said instrumentality;
      a signal generating device for converting said analog pressure signal into one or more serial pressure pulses; and
      means for selectively connecting said sub-systems to said signal generating device such that said signal generating device is adapted to receive said analog pressure signal from said signal source and transmit said serial pressure pulses to said actuator.

6. An air conditioning system for controlling the air temperature in a plurality of areas, including:
   a plurality of sub-systems, one of said sub-systems being located in each of said areas, and each of said sub-systems comprising:
      a temperature-sensing signal source for generating an analog pressure signal proportional to the sensed temperature,
      a temperature-regulating instrumentality,
      a pulse-operated actuator adapted to operate said instrumentality, and
      a feedback device for monitoring the operation of said actuator and providing a negative feedback pressure signal;
      a signal generating device for converting said analog pressure signal into one or more serial pressure pulses; and
      means for selectively connecting said sub-systems to said signal generating device such that said signal generating device is adapted to receive said analog pressure signal from said signal source and receive said negative feedback pressure signal from said feedback device and transmit said serial pressure pulses to said actuator.

7. The system as defined in claim 5, wherein said means for selectively connecting said sub-systems comprises a plurality of synchronized multi-port rotary selector switches.

8. The system as defined in claim 6, wherein said means for selectively connecting said sub-systems comprises a plurality of synchronized multi-port rotary selector switches.

9. The system as defined in claim 7, including means for automatically rotating said switches from station to station, with a predetermined residence time at each station.

10. The system as defined in claim 8, including means for automatically rotating said switches from station to station, with a predetermined residence time at each station.

References Cited
UNITED STATES PATENTS

| | | | |
|---|---|---|---|
| 1,296,250 | 3/1919 | Wyss | 236—15 |
| 1,621,620 | 3/1927 | Bast | 236—46 |
| 2,244,584 | 6/1941 | Turner | 236—46 |
| 2,623,699 | 12/1952 | Smith | 236—46 X |

EDWARD J. MICHAEL, *Primary Examiner.*